United States Patent
Guminski et al.

(10) Patent No.: US 9,367,778 B2
(45) Date of Patent: Jun. 14, 2016

(54) DOCUMENT FINISHING ARCHITECTURE (DFA) MASTER CONTROLLER

(71) Applicant: XEROX Corporation, Norwalk, CT (US)

(72) Inventors: William J. Guminski, Rochester, NY (US); Paul N. Richards, Fairport, NY (US); Rui Amorim, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 38 days.

(21) Appl. No.: 13/743,588

(22) Filed: Jan. 17, 2013

(65) Prior Publication Data

US 2014/0198329 A1     Jul. 17, 2014

(51) Int. Cl.
| | |
|---|---|
| G06K 15/00 | (2006.01) |
| B65H 43/00 | (2006.01) |
| H04N 1/00 | (2006.01) |
| G03G 15/00 | (2006.01) |
| G06K 15/02 | (2006.01) |
| G03G 21/14 | (2006.01) |

(52) U.S. Cl.
CPC .............. *G06K 15/403* (2013.01); *B65H 43/00* (2013.01); *G03G 15/50* (2013.01); *G03G 15/6582* (2013.01); *G06K 15/1805* (2013.01); *H04N 1/0032* (2013.01); *B65H 2402/10* (2013.01); *B65H 2402/62* (2013.01); *B65H 2557/30* (2013.01); *B65H 2801/27* (2013.01); *G03G 21/14* (2013.01); *G03G 2215/00109* (2013.01); *H04N 2201/0094* (2013.01)

(58) Field of Classification Search
CPC combination set(s) only.
See application file for complete search history.

(56) References Cited

U.S. PATENT DOCUMENTS

| | | | |
|---|---|---|---|
| 5,422,705 | A | 6/1995 | Omelchenko et al. |
| 5,629,775 | A | 5/1997 | Platteter et al. |
| 5,764,369 | A | 6/1998 | Farrell et al. |
| 6,025,926 | A | 2/2000 | Smith et al. |
| 6,241,404 | B1 | 6/2001 | Fietze et al. |
| 6,549,299 | B1 | 4/2003 | Allen et al. |
| 6,865,371 | B2 | 3/2005 | Salonidis et al. |

(Continued)

OTHER PUBLICATIONS

Document Feeding & Finishing Standards DFA Level 1—Generic Specification, version 3.0.3, Feb. 2011, pp. 1-46.

(Continued)

*Primary Examiner* — Tammy Pham
*Assistant Examiner* — Idowu O Osifade
(74) *Attorney, Agent, or Firm* — Gibb & Riley, LLC

(57) ABSTRACT

A Document Finishing Architecture Master controller includes an input communication link enabling two-way communication with a document-handling device. The document-handling device is restricted to connections with document finishing devices (DFDs) connected in series. Output communication links are operatively connected to the input communication link. The output communication links enable two-way communication over parallel communication networks with the DFDs. A translator is operatively connected to the output communication link, and driver interfaces are operatively connected to the translator. Document-finishing signals originating from the document-handling device are translated by the translator to a protocol used by the DFDs. The document-finishing signals are communicated from the translator to the driver interfaces, and from the driver interface to the DFDs. DFD signals from the DFDs are translated by the translator to a protocol used by the document-handling device. The DFD signals are communicated from the driver interfaces to the translator and from the translator to the document-handling device.

25 Claims, 5 Drawing Sheets

(56) References Cited

U.S. PATENT DOCUMENTS

| | | |
|---|---|---|
| 6,930,791 B2 | 8/2005 | Jackelen |
| 6,973,286 B2 | 12/2005 | Mandel et al. |
| 7,061,636 B2 | 6/2006 | Ryan et al. |
| 7,206,087 B2 | 4/2007 | Ryan et al. |
| 7,440,127 B2 | 10/2008 | Platteter et al. |
| 7,444,108 B2 | 10/2008 | Moore et al. |
| 7,581,894 B2 | 9/2009 | Sharma et al. |
| 7,924,443 B2 | 4/2011 | Moore |
| 8,089,650 B2 | 1/2012 | Jimenez-Gomez |
| 8,208,159 B2 | 6/2012 | Knodt et al. |
| 8,218,170 B2 | 7/2012 | Klopsch et al. |
| 8,233,175 B2 | 7/2012 | Richards et al. |
| 2001/0017708 A1* | 8/2001 | Kobayashi et al. .......... 358/1.13 |
| 2006/0001902 A1* | 1/2006 | Platteter et al. .............. 358/1.15 |
| 2006/0285151 A1* | 12/2006 | Kurita ................. G03G 15/5087 358/1.15 |
| 2007/0217796 A1* | 9/2007 | German ............. G03G 15/5062 399/9 |
| 2008/0264285 A1* | 10/2008 | Morales ................ G03G 15/50 101/483 |
| 2008/0304697 A1* | 12/2008 | Richards ........... G03G 15/6538 382/100 |
| 2011/0267641 A1 | 11/2011 | Stacy |

OTHER PUBLICATIONS

Master Controls—Technical Product Specifications v 1.0, Xerox Corporation and PMD, Jul. 7, 2012, pp. 1-16.

* cited by examiner

DOCUMENT FINISHING ARCHITECTURE (DFA) MASTER CONTROLLER

BACKGROUND

Systems and methods herein generally relate to reprographic, publishing, and imaging devices and, more particularly, to a master controller for enabling increased productivity in reprographic, publishing, and imaging systems having multiple finishing devices.

High end reprographic and electronic imaging systems generally include a document handling device, such as an image output terminal (IOT), providing documents to one or more document finishing devices (DFDs), and/or receiving media from one or more external feeding devices (EFDs). In such systems, the IOT generally controls the scheduling and flow of documents to the DFDs and/or EFDs.

Such high-end reprographic and electronic imaging systems generally communicate via an interface such as, for example, a Document Finishing Architecture (DFA). The DFA interface is a high-level set of specifications for implementing hardware and software interconnections between DFA compliant finishing and feeding devices, including DFDs and EFDs, and high-end electronic imaging and reprographic devices. The DFA interface specification is designed to be general enough to accommodate devices with different performance capabilities and specific enough to enable physical interconnection without significant hardware and software changes.

Creation and production of printed documents often involves many production and finishing operations that are highly variable with each job. In general, the various operations can be grouped into three major phases: 1) creation of the document information, including prepress operations that render the document in a form suitable for printing, 2) printing of the information onto some form of media such as paper, and 3) finishing of the selected media into a completed document. These three major phases often have many sub-phases, and the entire process may vary from relatively simple to extremely complex.

Traditionally, in phase 1, when a document is composed, the person doing the composition will create one or more electronic image files that represent the parts of the document to be produced. These electronic image data files may be stored in many different formats by many different document creation and manipulation programs. For instance, for a complex document such as a book that utilizes color printing for book covers and pictorial inserts, any of a variety of Page Description Languages (PDLs), such as Postscript® and Postscript-compatible languages, may be used to render the color images in printable form. Often different components within a document will utilize different PDLs. For instance, the cover may be created by a different work team or upon different equipment than photographic reprints or other internal color components. Each prepress team or prepress device may utilize a PDL optimized for its use. For pages comprised of simple monochrome text, a desktop publishing program may be utilized to render such pages or a simpler word processing language may be utilized. Other prepress formats may be utilized for printing of inserts, dividers, and other possible components internal to the finished document. There also may be included in the assembly/finishing job non-printed components such as, without limitation, plastic separators, previously printed sheets retrieved from inventory, photographically produced sheets, or specialized media such as vinyl disk holders or perfume sample packs.

Following the successful reproduction of one or more documents in this fashion, it is often desirable to perform one or more of a wide variety of post-processing functions on the printed documents. For example, certain applications require the selective addition of color or other enhancements to the printed documents using ink jet annotation or the like, application of magnetic ink character recognition media, job/document serial number and account auditing, insertion of pages into the printed documents, brail embossing, cutting, perforation, slitting, stacking, binding, packaging, envelope stuffing, and/or postage metering. Heretofore, the post-processing functions could be carried out off-line with one or more dedicated post-processing devices. Of course, the off-line devices were specially designed to perform certain specific post-processing functions. As the post-processing requirements became more numerous and more complex, performance of other post-processing functions necessitated the replacement of some or all of these off-line devices in their entirety, including all of the base document handling equipment and other hardware thereof. Other post-processing devices are designed to work in-line with a printing apparatus. Like the off-line devices, these in-line devices have been limited to specific functions, and must be completely replaced in the event an end-user desires to perform different post-processing operations.

SUMMARY

According to a document controller herein, the document controller comprises an input communication link enabling two-way communication with a document handling device. The document handling device is restricted to connections with document finishing devices (DFDs) connected in series. Output communication links are operatively connected to the input communication link. The output communication links enable two-way communication over parallel communication networks with the DFDs. A translator is operatively connected to the input communication link, and driver interfaces are operatively connected to the translator. Document finishing signals originating from the document handling device are translated by the translator to a protocol used by the DFDs. The document finishing signals are communicated from the translator to the driver interfaces, and from the driver interface to the DFDs. DFD signals from the DFDs are translated by the translator to a protocol used by the document handling device. The DFD signals are communicated from the driver interfaces to the translator and from the translator to the document handling device.

According to a system herein, the system comprises a document handling device and document finishing devices (DFDs) operatively connected to the document handling device. The document handling device is restricted to connections with the DFDs connected in series. A controller is operatively connected in series to the document handling device. The controller is operatively connected in parallel to the DFDs. The controller comprises an input communication link enabling two-way communication with the document handling device and output communication links operatively connected to the input communication link. The output communication links enable two-way communication over parallel communication networks with the DFDs. A translator is operatively connected to the input communication link and driver interfaces are operatively connected to the translator. Document handling device signals originating from the document handling device are translated by the translator to a protocol used by the DFDs. The document handling device signals are communicated from the translator to the driver interfaces and from the driver interfaces to the DFDs. DFD signals originating from the DFDs are translated by the translator to a protocol used by the document handling device. The DFD signals are communicated from the driver interfaces to the translator and from the translator to the document handling device.

According to a method herein, a document finishing job is received into a computerized device from a user interface. Document information is received from a document handling device over a first communications network connected to the computerized device and the document handling device. The document handling device is restricted to connections with finishing devices connected in series. A first finishing device to be used in performance of a first finishing portion of the document finishing job is identified using the computerized device. The document information is translated to a protocol used by the first finishing device, using the computerized device. Programming data to configure device attributes of the first finishing device for the first finishing portion of the document finishing job is communicated over a second communications network connected to the computerized device and the first finishing device, by the computerized device, according to the protocol used by the first finishing device. An additional finishing device to be used in performance of an additional finishing portion of the document finishing job is identified using the computerized device. The document information is translated to a protocol used by the additional finishing device, using the computerized device. Programming data to configure device attributes of the additional finishing device for the additional finishing portion of the document finishing job is communicated over an additional communications network connected to the computerized device and the additional finishing device, by the computerized device, according to the protocol used by the additional finishing device. The additional communications network is in parallel to the second communications network.

According to another method herein, document finishing information is received from a document handling device. The document handling device is restricted to connections with finishing devices connected in series. A first finishing device and a second finishing device to be used in performance of different portions of the document finishing information are identified using a computerized device connected to the document handling device in series. The document finishing information is translated into different protocols used by the first finishing device and the second finishing device to produce translated finishing information, using the computerized device. The translated finishing information is sent to the first finishing device and the second finishing device from the computerized device over different communications networks connected in parallel to the computerized device to configure device attributes of the first finishing device and the second finishing device.

These and other features are described in, or are apparent from, the following detailed description.

BRIEF DESCRIPTION OF THE DRAWINGS

Various examples of the systems and methods are described in detail below, with reference to the attached drawing figures, in which.

DETAILED DESCRIPTION

Figure 1:
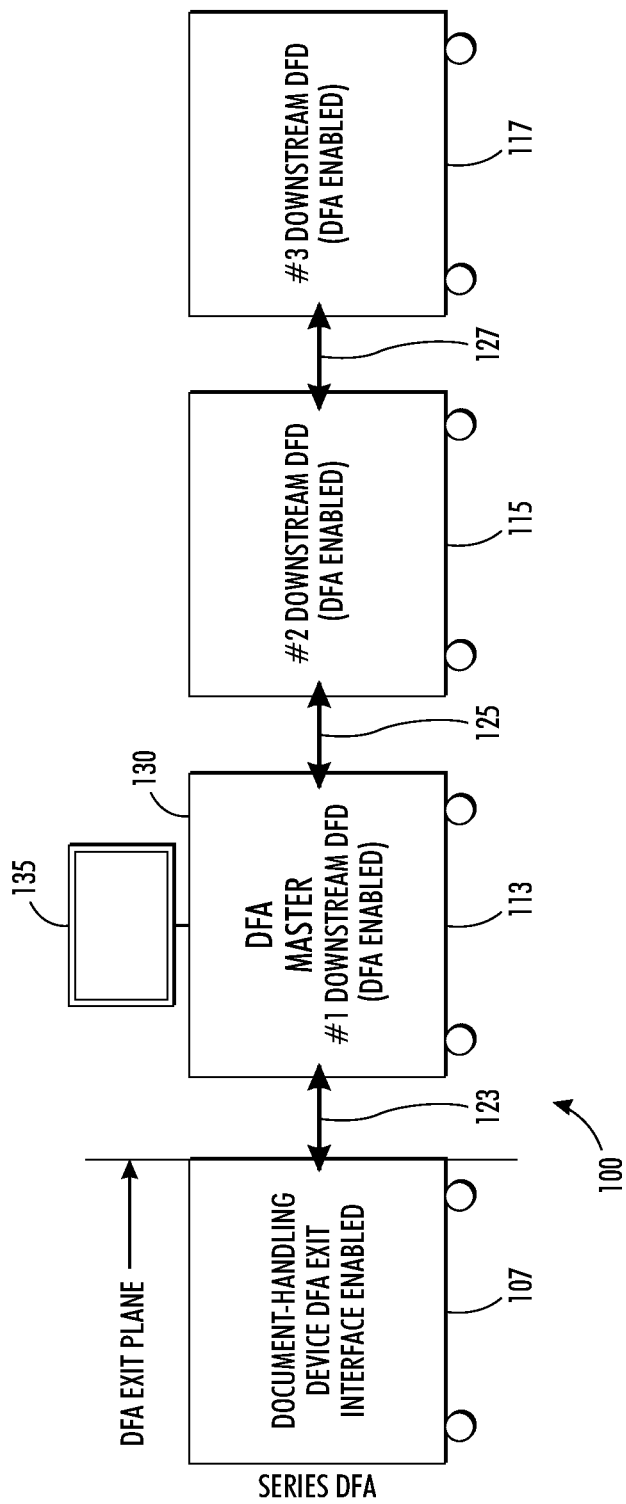
FIG. 1 is a block diagram of a DFA Master according to systems and methods herein.

The disclosure will now be described by reference to an exemplary system and apparatus that includes a finishing system having an enhanced controller. While the disclosure will be described hereinafter in connection with specific systems and methods thereof, it will be understood that limiting the disclosure to such systems and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

An Image Output Terminal (IOT) typically includes a marking engine, raster output scanner (ROS) or line marking array, paper transport and delivery system plus a bypass transport, machine controllers, electronic interface to Print Service Processor, DC power supplies and AC power interface, and controls. In general, IOTs are packaged as a freestanding console unit and may be co-packaged with a controller. Additionally, an IOT may include a user interface, maintenance interface, video data buffer, command buffer, test pattern generator, standalone diagnostics, and billing meters.

A Document Finishing Device (DFD) or External Feeding Device (EFD) includes feeding or finishing devices (stackers, binders, etc.), paper transports and delivery system, electronic interface to the IOT, mechanical latching mechanism to latch with an IOT, control electronics, DC power supplies and AC power interface, and controls. A Document Finishing Device (DFD) or External Feeding Device (EFD) may include basic Finishing/Feeding functions, a user interface, maintenance interface, test generator, standalone diagnostics, and billing meters.

Document Finishing Architecture (DFA) is a set of published specifications that allow finisher vendors to develop in-line devices that are compatible with compliant IOT/handling equipment. The Document Finishing Architecture (DFA) interface embodies the communications by which the functions of the IOT/handling equipment are synchronized with the real-time requirements of the DFD/EFD (and vice versa) and by which the IOT/handling equipment controls the operational states of the DFD/EFD.

A DFA Interface supports a maximum of one document finishing device and one external feeding device at any one time, and only a limited number of discrete command and status signals are supported. Data, such as sheet exit from IOT, end of set, and fault condition, is communicated using these discrete signals. The DFA Interface may be used to interface a document handling device with finishing equipment, such as a binders, booklet makers, or inserters, each of which is DFA enabled. However, as shown in FIG. 1, the IOT document handling device is restricted to connections with document finishing devices that are connected in series. In view of this, the methods and systems herein present a DFA master controller that can connect to the document handling device or image output printing device in series, can perform translation for different protocol finishing devices, and can be connected to finishing devices in parallel over different parallel networks. Further, this DFA master controller can communicate with wide area networks (WANs) that operate in parallel, allowing finishing operations to occur at different geographical locations.

Referring to FIG. 1, a series aligned document production system, indicated generally as 100, is shown. The document production system 100 begins with a document handling device 107. The document handling device 107 may be an image output terminal, such as a printer, a stand-alone external feeding device, or the like. The document production system 100 includes one or more document finishing devices 113, 115, 117 connected in series using connectors 123, 125, 127, each attached to a DFA Interface on each of the document handling device 107 and the document finishing devices 113, 115, 117. By default, the first downstream document finishing device 113 is designated the DFA Master 130. The DFA Master 130 has a user interface device 135 for displaying system status and accepting operator input. Since the document production system 100 is connected in series, instructions from the DFA Master 130 to document finishing device 117 must pass through document finishing device 115. Additionally, the DFA architecture shown in FIG. 1 may require operator interface and intervention with each downstream device, separately.

Figure 2:
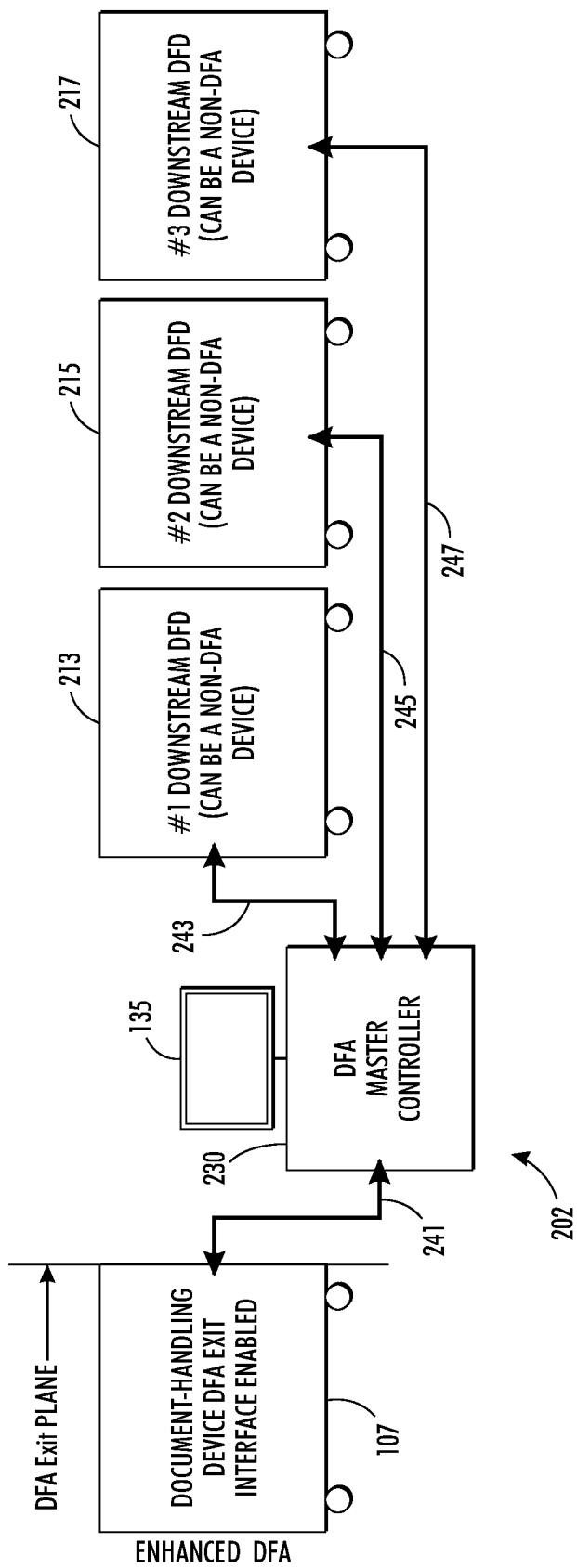
FIG. 2 is a block diagram of a DFA Master Controller according to systems and methods herein.

FIG. 2 shows an enhanced Document Finishing Architecture controller according to systems and methods herein. A document production system, indicated generally as 202, includes a document handling device 107, one or more document finishing devices 213, 215, 217, and a DFA Master Controller 230. As in FIG. 1, the document handling device 107 may be an image output terminal, such as a printer, a stand-alone external feeding device, or the like. According to systems and methods herein, the document handling device 107 may be a DFA enabled device; however, according to systems and methods herein, the document finishing devices 213, 215, 217 need not be DFA enabled devices. Some non-limiting examples of document finishing devices, according to systems and methods herein, may include a cutting device, stacking device, transport device, and a packaging device, such as a shrink wrapping unit. Communications between each of these components and management of the document production system 202 is handled by the DFA Master Controller 230 through a user interface device 135 that displays system status and accepts operator input.

According to system and methods herein, the DFA Master Controller 230 is not limited to one document finishing device and one external feeding device at any one time. The DFA Master Controller 230 has parallel communication paths for both upstream and downstream workflow devices. For example, the DFA Master Controller 230 may be connected to the document handling device 107 by input communication link 241, through a DFA compatible connector, and connected to the document finishing devices 213, 215, 217 by output communication links 243, 245, 247, respectively. The DFA Master Controller 230 receives document handling signals from the document handling device 107. The DFA Master Controller 230, according to the systems and methods herein, provides faster and more complex finishing features via parallel communications with the downstream devices, accepts a variety of communication protocols, and can be programmed by means of centralized controls.

The DFA Master Controller 230 in FIG. 2 provides the DFA interface to the downstream document finishing devices 213, 215, 217 at the DFA exit interface in a similar fashion as with the series aligned document production system 100 shown in FIG. 1. The DFA Master Controller 230 in FIG. 2 communicates directly with each of the downstream document finishing devices 213, 215, 217 in parallel. The DFA Master Controller 230 enables faster and more complex finishing features via parallel communications with downstream document finishing devices 213, 215, 217. This parallel communications enables faster communications between the document handling device 107 and the downstream document finishing devices 213, 215, 217. Faster communications allows for more complex and integrated functions of the downstream document finishing devices 213, 215, 217.

The DFA Master Controller 230 interfaces with a number of downstream document finishing devices 213, 215, 217 via predefined communications protocols. The DFA Master Controller 230 is programmed to decipher the incoming information from the downstream document finishing devices 213, 215, 217. The DFA Master Controller 230 then communicates the appropriate DFA signals upstream to the document handling device 107 and the integrated control functions to the downstream document finishing devices 213, 215, 217. The DFA Master Controller 230 may be programmed to decipher the document handling signals from the upstream device and communicate the appropriate information to the downstream devices. The document handling signals may comprise DFA control signals.

The DFA Master Controller 230 incorporates parallel communications paths to any number of downstream devices in a production line and coordinates the functions of the various output devices. The DFA Master Controller 230 also provides a DFA connection to a document handling device 107, such as a printer.

In other words, the DFA Master Controller 230 serves as a generic DFA "black box" to an upstream DFA enabled device, such as a printer/sheet feeder/etc. The DFA Master Controller 230 may be accessed via a user interface device 135 to enable routine system service and system diagnostics. The DFA Master Controller 230 also serves as a flexible communication link to all downstream document finishing devices 213, 215, 217 by translating the DFA signals into a protocol understood by the downstream document finishing devices 213, 215, 217, as well as translating status information from the downstream document finishing devices 213, 215, 217 back into DFA signals for relaying back to the input document handling device 107.

For example, downstream document finishing devices may include a laser cutting/stacking/transport module as a first document finishing device, a robotics module as a second document finishing device, and a shrink-wrap module as a third document finishing device. The laser cutting/stacking/transport module accepts sheets from an input device onto an input conveyor. Sheets are then laser cut into cards and stacked by the robotics module. Stacked cards are then moved to a product conveyor for transport to the shrink-wrap module. The laser cutting/stacking/transport module manages and controls a waste conveyor to transport the scrim waste from the cutting operation to the waste bins. All the processing steps are controlled by the DFA Master Controller 230. Additionally, processing status is reported to the DFA Master Controller 230 from each of the document finishing devices.

According to systems and methods herein, the DFA Master Controller 230 is capable of communicating with a variety of document feeding/finishing devices that may employ any number of interfaces/protocols. Standard communication protocols enable flexibility to interface with a wide variety of devices. The DFA Master Controller 230 can handle a variety of combinations of downstream document finishing devices 213, 215, 217, each of which may utilize different interface categories. The DFA Master Controller 230 provides communications channels between the various modules in the system via an assortment of data interfaces depending on the particular requirements of each particular module.

DFA communication and control resides in the DFA Master Controller 230 as a stand-alone device with a user interface device 135. The user interface device 135 enables centralized control and programming of downstream document finishing devices 213, 215, 217. Through a user interface device 135 on the DFA Master Controller 230, an operator may program functions for the various downstream document finishing devices 213, 215, 217. In some systems, the DFA Master Controller 230 may communicate the system status via an attention lamp and/or a screen on the user interface device 135. In some systems, system functional log data can also be stored in the DFA Master Controller 230 and accessed via the user interface device 135. System service and diagnostic routines can also be accessed via the DFA Master Controller 230.

The user interface device 135 may be a graphic user interface comprising a monitor that will be the main go-to point for operator interaction with the system. In some systems, the user interface device 135 may be touch screen enabled. Non-limiting examples of functions a user may be able to perform from the user interface device 135 include:
  Start Production
  Stop Production
  Pause Production (to clear an obstruction, for example)
  Enter Service/Maintenance mode
  View overall system status
  View status for each module
  View event/fault logs
  View production logs
  Download log data to USB drive In some systems, the user interface device 135 may also provide physical buttons for estop activation/reset and a key switch for cycling system power. The user interface device 135 may provide a USB port or other interface to allow saving data to a thumb drive or similar device.

Additionally, the DFA Master Controller 230 may provide status indication from each of the downstream document finishing devices 213, 215, 217, separately or in combination, as well as times for such status. Non-limiting examples of status a user may be able to view from the user interface device 135 include:
  Offline
  Alarm/Warning
  Faulted
  Sheet delivered
  Set delivered According to systems and methods herein, the DFA Master Controller 230 includes an input communication link 241 enabling two-way communication with a document handling device 107, through a DFA compatible connector. The document handling device 107 is restricted to connections with document finishing devices connected in series. Output communication links 243, 245, 247 are operatively connected to the input communication link 241. The output communication links 243, 245, 247 enable two-way communication over parallel communication networks with the document finishing devices 213, 215, 217. A translator is operatively connected to the input communication link 241, and driver interfaces are operatively connected to the translator. Document finishing signals originating from the document handling device 107 are translated by the translator to a protocol used by the document finishing devices 213, 215, 217. The document finishing signals are communicated from the translator to the driver interfaces and from the driver interface to the document finishing devices 213, 215, 217. DFD signals from the document finishing devices 213, 215, 217 are translated by the translator to a protocol used by the document handling device 107. The DFD signals are communicated from the driver interfaces to the translator and from the translator to the document handling device 107.

As described above, the document production system 202 comprises a document handling device 107 and a plurality of document finishing devices 213, 215, 217 operatively connected to the document handling device 107. The document handling device 107 is restricted to connections with the DFDs connected in series. A DFA Master Controller 230 is operatively connected in series to the document handling device 107. The DFA Master Controller 230 is operatively connected in parallel to the plurality of document finishing devices 213, 215, 217. The DFA Master Controller 230 includes an input communication link 241 enabling two-way communication with the document handling device 107, through a DFA compatible connector, and a plurality of output communication links 243, 245, 247 operatively connected to the input communication link 241. The output communication links 243, 245, 247 enable two-way communication over parallel communication networks with the document finishing devices 213, 215, 217. A translator is operatively connected to the input communication link 241, and driver interfaces are operatively connected to the translator. Document handling device signals originating from the document handling device 107 are translated by the translator to a protocol used by the document finishing devices 213, 215, 217. The document handling device signals are communicated from the translator to the driver interfaces and from the driver interfaces to the document finishing devices 213, 215, 217. DFD signals originating from the document finishing devices 213, 215, 217 are translated by the translator to a protocol used by the document handling device 107. The DFD signals are communicated from the driver interfaces to the translator and from the translator to the document handling device 107.

As described above, the DFA Master Controller 230 performs several operations. It serves as a "gate keeper" between an output device and downstream devices. Some of the functions that the DFA Master Controller 230 may perform include:
  communicating upstream signals (from printing devices, etc.) to downstream devices (finishing equipment, etc.)
  communicating downstream signals (from finishing equipment, etc.) to upstream device (printing devices, etc.)
  documenting/creating system log files that can be used for many reasons (system diagnosis, HSFI maintenance, etc.)

Both communication directions indicate activities within the document production system 202, such as system status, faults, operator and service requirements, etc. According to systems and methods herein, the DFA Master Controller 230 is flexible enough to accept operating protocols from a variety of devices, and can be configured to control downstream devices in parallel or series configurations.

Figure 3:
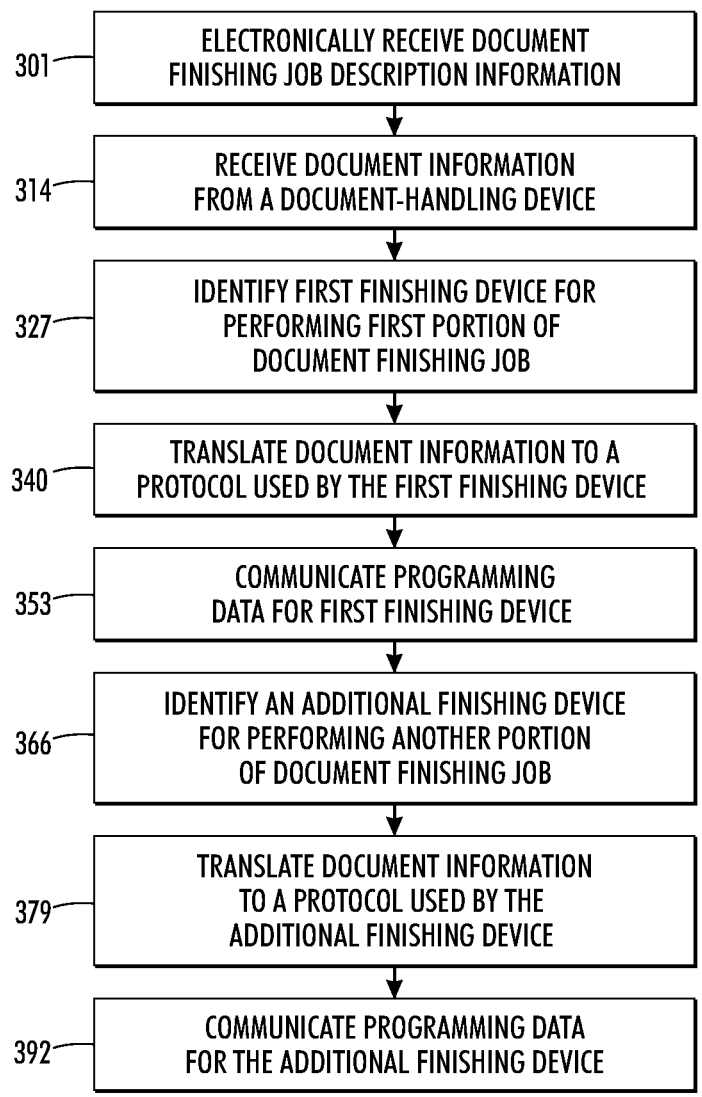
FIG. 3 is a flow diagram illustrating systems and methods herein.

FIG. 3 is a flow diagram illustrating the processing flow of an exemplary method according to the disclosure herein. In item 301, document finishing job description information is received into a computerized device from a user interface. At 314, document information is received from a document handling device over a first communications network between the computerized device and the document handling device. At 327, a first finishing device to be used in performance of a first finishing portion of the document finishing job is identified. The document information is translated to a protocol used by the first finishing device, at 340. At 353, programming data to configure device attributes of the first finishing device for the first finishing portion of the document finishing job is communicated over a second communications network between the computerized device and the first finishing device, according to the protocol used by the first finishing device. At 366, at least one additional finishing device to be used in performance of at least one additional finishing portion of the document finishing job is identified. The document information is translated to a protocol used by the at least one additional finishing device, at 379. At 392, programming data to configure device attributes of the at least one additional finishing device for the at least one additional finishing portion of the document finishing job is communicated over at least one additional communications network between the computerized device and the additional finishing device, according to the protocol used by the at least one additional finishing device. The at least one additional communications network is in parallel to the second communications network.

Figure 4:
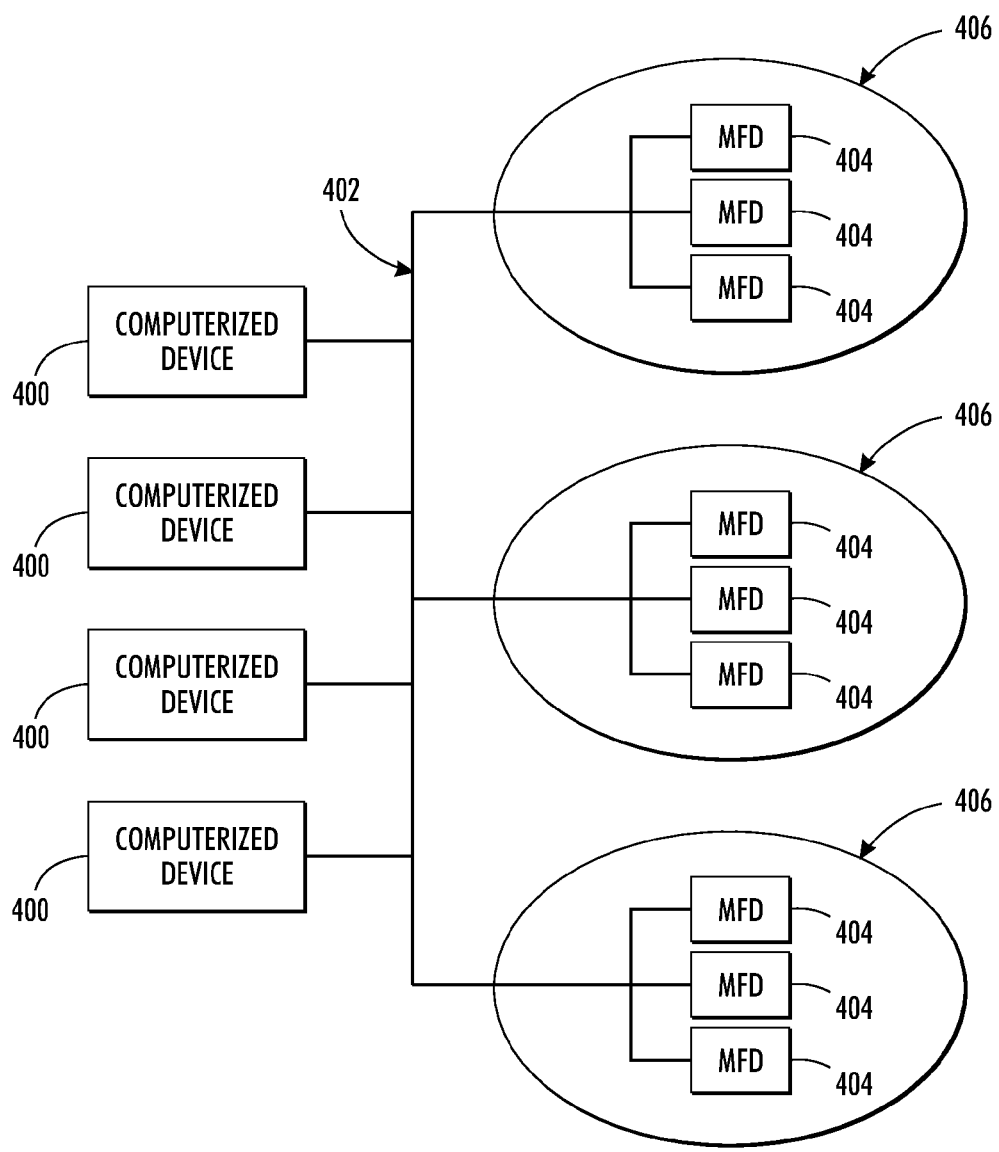
FIG. 4 is a diagram of an exemplary system according to the present disclosure.

As shown in FIG. 4, an exemplary system herein includes various computerized devices 400, 404 located at different physical locations 406. The computerized devices 400, 404 can include print servers, printing devices, personal computers, multifunctional devices (MFD), document handling devices, etc., and are in communication (operatively connected to one another) by way of a network 402. According to systems and methods herein, the network 402 may comprise a local or wide area network (wired or wireless).

Figure 5:
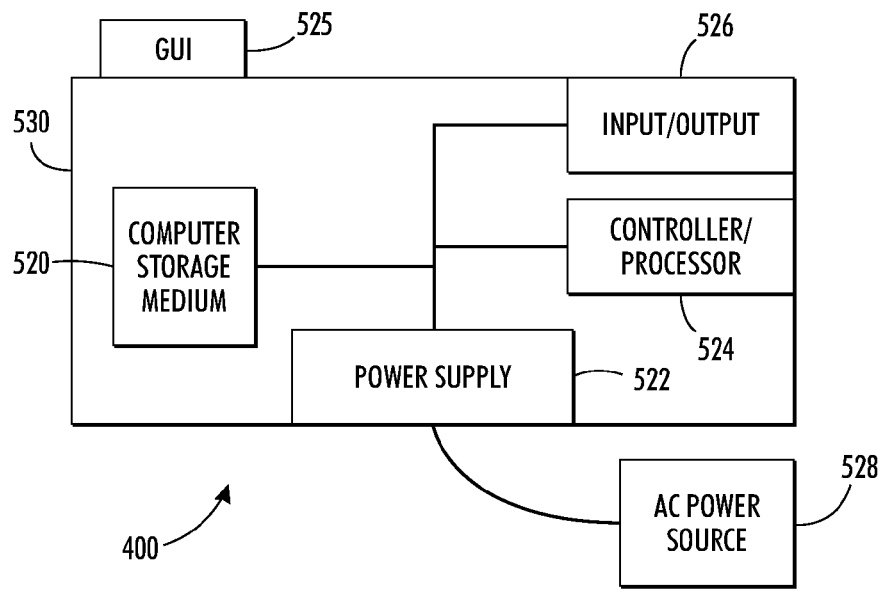
FIG. 5 is a cross-sectional schematic diagram of a computer device according to systems and methods herein.

FIG. 5 illustrates a computerized device 400 that can be used with systems and methods herein and can comprise, for example, a print server, a personal computer, a portable computing device, multifunctional device (MFD), document handling device, etc. The computerized device 400 includes a controller/processor 524 and a communications port (input/output) 526 operatively connected to the controller/processor 524 and to the network 402 external to the computerized device 400. In addition, the computerized device 400 can include at least one accessory functional component, such as a graphic user interface (GUI) assembly 525 that also operates on the power supplied from the AC power source 528, which may be external to the computerized device 400. The AC power source 528 may provide electrical power through the power supply 522.

The input/output device 526 is used for communications to and from the computerized device 400. The controller/processor 524 controls the various actions of the computerized device. A non-transitory computer storage medium device 520 (which can be optical, magnetic, capacitor based, etc.) is readable by the controller/processor 524 and stores instructions that the controller/processor 524 executes to allow the computerized device to perform its various functions, such as those described herein. Thus, as shown in FIG. 5, a printing device housing 530 has one or more functional components that operate on power supplied from the AC power source 528 by the power supply 522. The power supply 522 can comprise a power storage element (e.g., a battery) and connects to the AC power source 528, which may be external to the computerized device 400. The power supply 522 converts the external power into the type of power needed by the various components.

Figure 6:
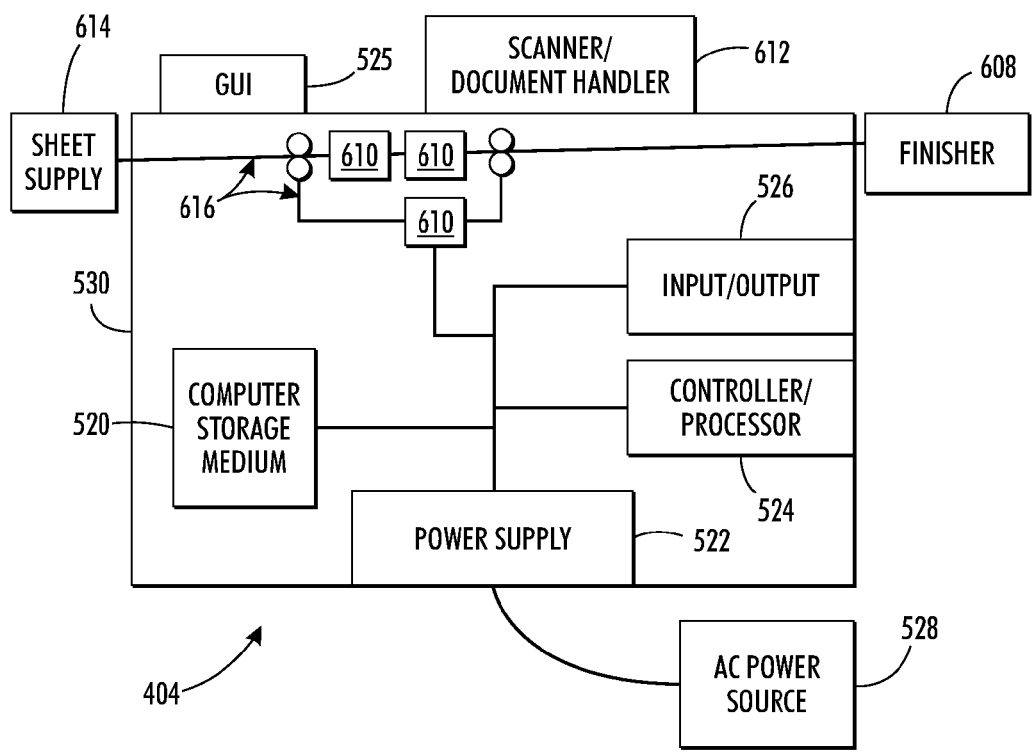
FIG. 6 is a cross-sectional schematic diagram of a printing device/IOT according to systems and methods herein.

FIG. 6 illustrates a printing device 404 that can be used with systems and methods herein and can comprise, for example, a printer, copier, multi-function machine, multi-function device (MFD), etc. The printing device 404 includes many of the components mentioned above and at least one marking device (printing engines) 610 operatively connected to the controller/processor 524, a media path 616 positioned to supply sheets of media from a sheet supply 614 to the marking device(s) 610, etc. After receiving various markings from the printing engine(s), the sheets of media can optionally pass to a finisher 608 which can fold, staple, sort, etc., the various printed sheets. In addition, the printing device 404 can include at least one accessory functional component (such as a scanner/document handler 612, etc.) that also operates on the power supplied from the AC power source 528 (through the power supply 522).

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are discussed in, for example, U.S. Pat. No. 6,032,004, the complete disclosure of which is fully incorporated herein by reference. The systems and methods herein can encompass devices that print in color, monochrome, or handle color or monochrome image data. All foregoing systems and methods are specifically applicable to a variety of reprographic devices including electrostatographic and/or xerographic machines and/or processes.

It should be understood that the term "controller" as used herein comprises a computerized device adapted to perform (i.e., programmed to perform, configured to perform, etc.) the above described system operations (e.g., controlling cleaning roller movement, controlling cleaning roller rotation, etc.). According to systems and methods herein, this controller comprises a programmable, self-contained, dedicated mini-computer having a central processor unit (CPU), electronic storage, and a display or user interface (UI) and can function as the main control system for either a stand-alone document production system or multiple modules (e.g., the feeder module(s), stacker module(s), interface modules(s) printing module(s), cleaning modules, binding modules, etc.) within a modular document production system. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that, once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements to the systems and methods herein may be subsequently made by those skilled in the art, which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A document controller comprising:
an input communication link enabling two-way communication with a document handling device, said document handling device having a single communications outlet and being restricted to connections with document finishing devices (DFDs) connected in series;
output communication links operatively connected to said input communication link, said output communication links enabling two-way communication over separate communication networks with said DFDs, said document controller being directly connected to each of said DFDs, individually, using separate communications networks;
a translator operatively connected to said input communication link, said translator comprising a computerized device having a processor and
driver interfaces operatively connected to said translator,
document finishing signals originating from said document handling device being translated by said translator to a communication protocol used by said DFDs, said communication protocol used by said DFDs being different from the communication protocol used by said document handling device,
said document finishing signals being communicated from said translator to said driver interfaces, and from said driver interface to said DFDs,
DFD signals from said DFDs being translated by said translator to a protocol used by said document handling device, and
said DFD signals being communicated from said driver interfaces to said translator, and from said translator to said document handling device.

2. The document controller according to claim 1, said document handling device comprising one of an image output terminal and an external feeding device.

3. The document controller according to claim 1, said document handling device being compatible with document finishing architecture (DFA).

4. The document controller of claim 1, further comprising a document finishing architecture (DFA) compatible connector sending and receiving signals to and from said document handling device.

5. The document controller according to claim 1, said DFD signals comprising document finishing architecture (DFA) signals.

6. The document controller of claim 1, further comprising a user interface device comprising a touch screen displaying system status and accepting operator input.

7. The document controller according to claim 1, said DFDs comprising one or more of:
a cutting device;
a stacking device;
a transport device; and
a packaging device.

8. A system comprising:
a document handling device;
document finishing devices (DFDs) operatively connected to said document handling device, said document handling device having a single communications outlet and being restricted to connections with said DFDs connected in series; and
a controller operatively connected between said document handling device and said DFDs, said controller being operatively connected in series to said document handling device, said controller being operatively connected directly to each of said DFDs, individually, over separate communication networks, said controller comprising:
an input communication link enabling two-way communication with said document handling device using said single communications outlet of said document handling device;
output communication links operatively connected to said input communication link, said output communication links enabling two-way communication over said separate communication networks with said DFDs;
a translator operatively connected to said input communication link, said translator comprising a computerized device having a processor; and
driver interfaces operatively connected to said translator,
document handling device signals originating from said document handling device being translated by said translator to a communication protocol used by said DFDs, said communication protocol used by said DFDs being different from the communication protocol used by said document handling device,
said document handling device signals being communicated from said translator to said driver interfaces, and from said driver interfaces to said DFDs,
DFD signals originating from said DFDs being translated by said translator to a communication protocol used by said document handling device, said communication protocol used by said document handling device being different from the communication protocol used by said DFDs, and
said DFD signals being communicated from said driver interfaces to said translator, and from said translator to said document handling device.

9. The system according to claim 8, said document handling device comprising one of an image output terminal and an external feeding device.

10. The system according to claim 8, said document handling device being compatible with document finishing architecture (DFA).

11. The system according to claim 8, said controller further comprising a document finishing architecture (DFA) compatible connector sending and receiving signals to and from said document handling device.

12. The system according to claim 8, said DFD signals comprising document finishing architecture (DFA) signals.

13. The system of claim 8, further comprising a user interface device comprising a touch screen displaying system status and accepting operator input.

14. The system according to claim 8, said DFDs comprising one or more of:
a cutting device;
a stacking device;
a transport device; and
a packaging device.

15. A method comprising:
receiving a document finishing job into a computerized device from a user interface, said computerized device having a processor;
receiving document information from a document handling device over a first communications network connected between said computerized device and said document handling device, said document handling device being restricted to series connections with finishing devices;
identifying a first finishing device to be used in performance of a first finishing portion of said document finishing job, using said computerized device;
translating said document information to a communication protocol used by said first finishing device, using said computerized device, said communication protocol used by said first finishing device being different from the communication protocol used by said document handling device;
communicating, by said computerized device, over a second communications network, programming data to configure device attributes of said first finishing device for said first finishing portion of said document finishing job according to said communication protocol used by said first finishing device, said second communications network being directly connected to said computerized device at a first end of said second communications network and being directly connected to said first finishing device at a second end of said second communications network;
identifying an additional finishing device to be used in performance of an additional finishing portion of said document finishing job, using said computerized device;
translating said document information to a communication protocol used by said additional finishing device, using said computerized device, said communication protocol used by said additional finishing device being different from the communication protocol used by said document handling device; and
communicating, by said computerized device, over an additional communications network, programming data to configure device attributes of said additional finishing device for said additional finishing portion of said document finishing job according to said communication protocol used by said additional finishing device, said additional communications network being directly connected to said computerized device at a first end of said additional communications network and being directly connected to said additional finishing device at a second end of said additional communications network,
said additional communications network being separate from said second communications network.

16. The method according to claim 15, said document handling device comprising one of an image output terminal and an external feeding device.

17. The method according to claim 15, said document handling device being compatible with document finishing architecture (DFA).

18. The method according to claim 15, said receiving document information from said document handling device comprising receiving document finishing architecture (DFA) signals.

19. The method according to claim 15, said first finishing device and said additional finishing device comprising one or more of:
a cutting device;
a stacking device;
a transport device; and
a packaging device.

20. The method according to claim 15, at least one of said first finishing device and said additional finishing device being compatible with document finishing architecture (DFA).

21. The method comprising:
receiving document finishing information from a document handling device, said document handling device being restricted to series connections with finishing devices;
identifying a first finishing device and a second finishing device to be used in performance of different portions of said document finishing information, using a computerized device connected to said document handling device in series, said computerized device having a processor;
translating said document finishing information into different communication protocols used by said first finishing device and said second finishing device to produce translated finishing information, using said computerized device, said communication protocol used by said first finishing device being different from the communication protocol used by said document handling device, said communication protocol used by said second finishing device being different from the communication protocol used by said document handling device, and said communication protocol used by said first finishing device being different from the communication protocol used by said second document finishing device; and
sending said translated finishing information to said first finishing device and said second finishing device from said computerized device over different communications networks to configure device attributes of said first finishing device and said second finishing device, each of said different communications networks being connected directly to said computerized device and to each of said first finishing device and said second finishing device, individually.

22. The method according to claim 21, said document handling device comprising one of an image output terminal and an external feeding device.

23. The method according to claim 21, said computerized device being compatible with document finishing architecture (DFA).

24. The method according to claim 21, said first finishing device and said second finishing device comprising one or more of:
a cutting device;
a stacking device;
a transport device; and
a packaging device.

25. The method according to claim 21, at least one of said first finishing device and said second finishing device being compatible with document finishing architecture (DFA).

* * * * *